United States Patent
Wu et al.

(10) Patent No.: US 8,200,032 B2
(45) Date of Patent: Jun. 12, 2012

(54) IMAGE PROCESSING METHOD AND RELATED APPARATUS FOR PERFORMING IMAGE PROCESSING OPERATION ACCORDING TO IMAGE BLOCKS IN HORIZONTAL DIRECTION

(75) Inventors: Jen-Shi Wu, Hsinchu County (TW); Chung-Yi Chen, Nantou County (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 889 days.

(21) Appl. No.: 12/265,725

(22) Filed: Nov. 5, 2008

(65) Prior Publication Data
US 2009/0148067 A1   Jun. 11, 2009

(30) Foreign Application Priority Data
Dec. 6, 2007   (TW) ............................. 96146468 A

(51) Int. Cl.
*G06K 9/46* (2006.01)
*H04N 7/12* (2006.01)
*H04N 7/01* (2006.01)
*H04N 5/14* (2006.01)

(52) U.S. Cl. .................. 382/236; 375/240.16; 348/452; 348/699

(58) Field of Classification Search .................. 382/236
See application file for complete search history.

(56) References Cited

U.S. PATENT DOCUMENTS

| | | | |
|---|---|---|---|
| 6,421,698 B1 | 7/2002 | Hong | |
| 6,950,469 B2* | 9/2005 | Karczewicz et al. | 375/240.17 |
| 2004/0202373 A1 | 10/2004 | Lee | |
| 2005/0135481 A1 | 6/2005 | Sung | |
| 2007/0127572 A1* | 6/2007 | Sasai et al. | 375/240.16 |
| 2007/0242080 A1* | 10/2007 | Hamada et al. | 345/606 |

* cited by examiner

*Primary Examiner* — David Zarka
(74) *Attorney, Agent, or Firm* — Winston Hsu; Scott Margo

(57) ABSTRACT

An image processing method includes generating a block matching result by performing a block matching operation according to a plurality of image blocks in the horizontal direction without referring to an image block in the vertical or other directions and performing an image processing operation according to the block matching result of the block matching operation.

12 Claims, 3 Drawing Sheets

IMAGE PROCESSING METHOD AND RELATED APPARATUS FOR PERFORMING IMAGE PROCESSING OPERATION ACCORDING TO IMAGE BLOCKS IN HORIZONTAL DIRECTION

BACKGROUND OF THE INVENTION

1. Field of the Invention

The present invention relates to an image processing scheme, and more particularly, to an image processing method capable of reducing total circuit costs and computation complexity, and an apparatus thereof.

2. Description of the Prior Art

When proceeding with a block matching operation, a conventional image processing scheme usually takes account of multiple image blocks within a predetermined two-dimensional range in a previous image and then, among the image blocks, looks for the image block that is the most similar to a certain image block in a current image, to determine a motion vector. In practice, however, during the block matching operation, it is necessary to perform calculations for a large number of pixels, and the related computation procedure is very complicated. More line buffers are necessary since the line buffers used for storing pixel data need to buffer a large amount of pixel data. In this situation, ten or twenty line buffers are required in general. Thus, the total circuit costs for the conventional image processing scheme increase due to having more line buffers, and a longer computation period is necessary for completing the block matching operation.

SUMMARY OF THE INVENTION

It is therefore one of the objectives of the present invention to provide an image processing method and a related apparatus capable of reducing total circuit costs and computation complexity, to solve the above-mentioned problem.

According to an embodiment of the present invention, an image processing method is disclosed. The image processing method comprises generating a block matching result by performing a block matching operation according to a plurality of image blocks in the horizontal direction without referring to an image block in the vertical or other directions, and performing an image processing operation according to the block matching result of the block matching operation.

According to another embodiment of the present invention, an image processing apparatus is further disclosed. The image processing apparatus comprises a calculation circuit and an image processing circuit. The calculation circuit is utilized for performing a block matching operation to generate a block matching result according to only a plurality of image blocks in the horizontal direction without referring to an image block in the vertical or other direction. The image processing circuit is coupled to the calculation circuit and utilized for performing an image processing operation according to the block matching result of the block matching operation.

According to another embodiment of the present invention, an image processing method is disclosed. The image processing method includes performing a block matching operation to generate a block matching result corresponding to a position to be interpolated, and performing an image interpolation operation according to the block matching result by referring to an image block having a same horizontal position as the position to be interpolated without referring to an image block in the vertical or other directions.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
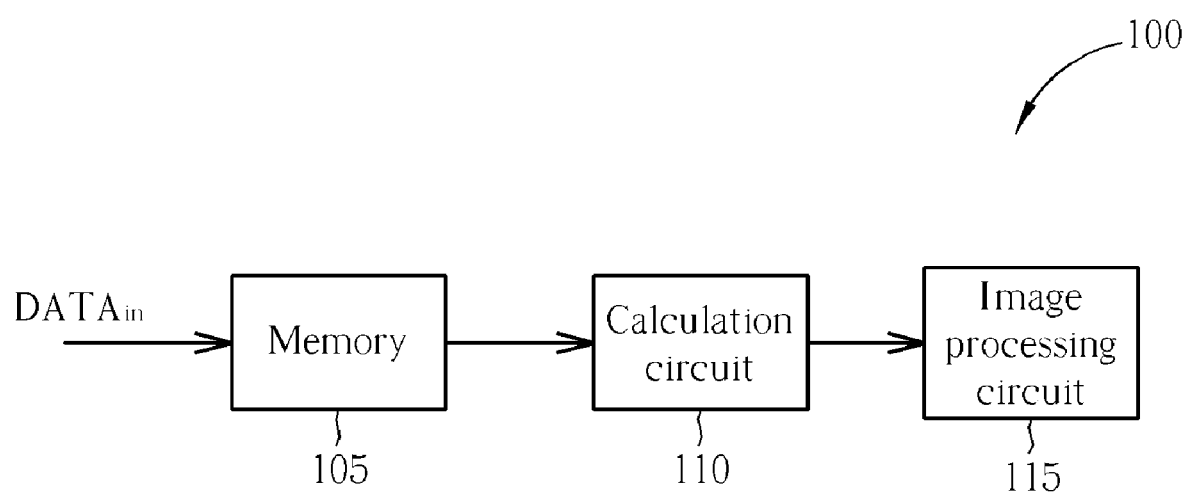
FIG. 1 is a schematic diagram of an image processing apparatus according to an embodiment of the present invention.

Refer to FIG. 1 showing a diagram of an image processing apparatus 100 according to an embodiment of the present invention. The image processing apparatus 100 includes a memory 105, a calculation circuit 110, and an image processing circuit 115. The calculation circuit 110 further includes a plurality of line buffers (not shown). The memory 105 is used for storing input data $DATA_{in}$ (e.g., pixel data of a plurality of frames/fields), which is received from an external device. The calculation circuit 110 is coupled to the memory 105, and performs a block matching operation according to a plurality of image blocks in the horizontal direction of the input data $DATA_{in}$ without referring to an image block in the vertical or other directions, and generates a block matching result accordingly. The image processing circuit 115 is coupled to the calculation circuit 110, and is utilized for performing an image processing operation (e.g., image interpolation) according to the block matching result of the block matching operation. In implementation, the calculation circuit 110 and image processing circuit 115 form a motion estimation/compensation circuit. Compared to the conventional image processing scheme mentioned above, the calculation circuit 110 performs the block matching operation according to the multiple image blocks in the horizontal direction without referring to any image blocks in the vertical or other directions, so the image processing apparatus 100 is capable of avoiding a large number of pixel calculations, decreasing computation complexity, as well as reducing the number of the required line buffers and lowering total circuit costs. The image processing apparatus 100 can operate in the manner described because the objects exhibiting horizontal motion in a picture are statistically more probable than objects with vertical motion. When interpolating an image block of a frame/field at a particular timing, for example, block matching operation is performed to find which image block of a frame/field at a previous timing is most similar to that of a frame/field at a next timing to thereby find a required motion vector for interpolating this image block. There is a great possibility that the found motion vector is a horizontal vector, i.e., the object corresponding to the image block is only moving horizontally at that time. Accordingly, in this embodiment, the block matching operation is performed by referring to image blocks in the horizontal direction only, for effects of decreasing total circuit costs, avoiding computation time wastage, and reducing computation complexity. In implementation, the calculation circuit 110 in this embodiment uses only two or three line buffers to achieve the operation of referring only to image blocks in the horizontal direction for performing the block matching operation. Compared to the conventional image processing scheme, the required number of line buffers is considerably decreased.

Figure 2:
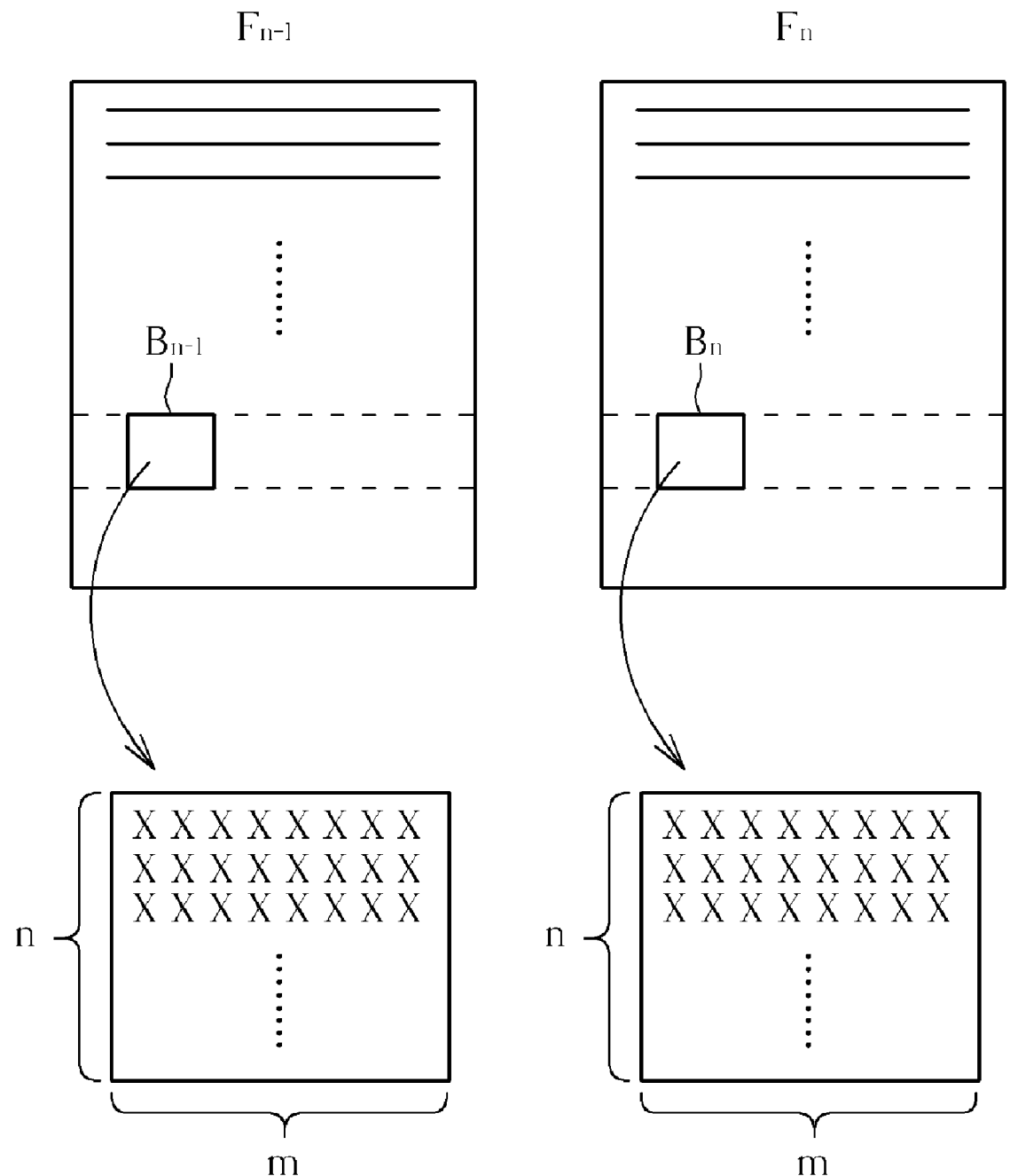
FIG. 2 is a schematic diagram illustrating an operation of the calculation circuit performing block matching for two frames.

In this embodiment, image interpolation is taken as an example of the image processing operation, but is not meant to be a limitation of the present invention. When performing the block matching operation, the calculation circuit 110 buffers required pixel data of the input data $DATA_{in}$ stored within the memory 105 one by one in the internal line buffers, and sums up calculated pixel differences for all corresponding positions to obtain a block matching difference. Please refer to FIG. 2, a diagram illustrating an operation of the calculation circuit 110 performing a block matching operation for two frames. As shown in FIG. 2, in this situation, the input data $DATA_{in}$ is composed of a sequence of frames. To reduce the number of required line buffers as much as possible, the calculation circuit 100 should include at least two line buffers. The operation of the calculation circuit 100 in FIG. 2 is explained by taking an example of two line buffers.

As described above, the calculation circuit 110 includes line buffers $L_1$ and $L_2$ in this example. For instance, when the calculation circuit 110 calculates a block matching difference (e.g., a sum of absolute differences (SAD) of pixels) upon an image block $B_{n-1}$ of a frame $F_{n-1}$ and an image block $B_n$ of an frame $F_n$, the calculation circuit 110 calculates pixel differences of respective corresponding positions in the image blocks $B_{n-1}$ and $B_n$ one by one and then sums up the pixel differences to derive a block matching difference between the image blocks $B_{n-1}$ and $B_n$. This is because the line buffers $L_1$ and $L_2$ are capable of simultaneously storing at most pixel data of the frames $F_{n-1}$ and $F_n$, respectively, the pixel data being corresponding to the same horizontal position. For example, the line buffer $L_1$ is capable of simultaneously storing pixel data within multiple image blocks of the same horizontal position as the image block $B_{n-1}$, and the line buffer $L_2$ is also capable of simultaneously storing pixel data within multiple image blocks of the same horizontal position as the image block $B_n$. That is, the image blocks referred by the calculation circuit 110 are generated in the line buffers $L_1$ and $L_2$. Please note that in this example the image blocks $B_{n-1}$ and $B_n$ are located at the same horizontal position. By repeatedly performing the block matching operation upon image blocks at the same horizontal position, a minimum block matching difference is derived. When performing image interpolation upon the frames $F_{n-1}$ and $F_n$, a motion vector corresponding to the minimum block matching difference can aid in determining a required image block for a position to be interpolated accordingly. The position to be interpolated and the image block $B_{n-1}/B_n$ are located at the same horizontal position.

Further, the line buffers $L_1$ and $L_2$ can be respectively designed to store pixel data of the frames $F_{n-1}$ and $F_n$, the pixel data being corresponding to the same horizontal line. In other words, for further reducing circuit costs, in another embodiment, the line buffers $L_1$ and $L_2$ are designed to simultaneously store at most pixel data of the same horizontal line of the frames $F_{n-1}$ and $F_n$, respectively. Since the calculation circuit 110 derives the block matching difference by summing up the pixel differences, the operation of the calculation circuit 110 stays uninfluenced. In addition, the number of pixels and the area of the above image blocks $B_{n-1}$ and $B_n$ are not meant to be limitations of the present invention. For example, in another embodiment, the image blocks $B_{n-1}$ and $B_n$ can have only 1×m pixels respectively, i.e., $B_{n-1}$ and $B_n$ are image blocks of one horizontal scan line crossed by m vertical scan lines. In this embodiment, $B_{n-1}$ and $B_n$ are not limited to image blocks consisted of n×m pixels respectively, as shown in FIG. 2. Both values n and m are larger than one and represent the number of pixels in the vertical and horizontal directions, respectively. For an image block having 1×m pixels, still only two line buffers are required for performing the block matching operation. At most, the line buffers can respectively store pixel data of two frames, the pixel data being corresponding to the same scan line; further operation is not detailed again for brevity.

Furthermore, when the block matching result of the block matching operation performed by the calculation circuit 110 indicates that the block matching differences calculated according to the image blocks in horizontal direction are all larger than a predetermined threshold $V_{th}$, the image processing circuit 115 directly repeats an image block of a previous image (i.e., a frame) when determining an image of this position to be interpolated, the repeated image block being located at the same position as the above-mentioned position to be interpolated. Otherwise, when the block matching result indicates that a minimum block matching difference in the block matching differences is not larger than the predetermined threshold $V_{th}$, the image processing circuit 115 performs image interpolation for the position to be interpolated according to a motion vector corresponding to the minimum block matching difference. That is, the image processing circuit 115 refers to the motion vector to perform image interpolation. If the block matching differences described above are all larger than the predetermined threshold $V_{th}$, it is possible that an object corresponding to the position to be interpolated moves vertically or in other directions in a previous/next image and does not only move horizontally. In this situation, since some serious distortions will be generated in an interpolated picture if the motion vector is directly used for image interpolation, the image processing circuit 115 chooses to directly repeat an image block having the same position as the position to be interpolated in a previous image without reference to the motion vector.

In another example, the input data $DATA_{in}$ is composed of a sequence of fields instead of frames, and the calculation circuit 110 further includes a line buffer $L_3$ in addition to the line buffers $L_1$ and $L_2$. The line buffer $L_1$ can simultaneously store at most pixel data of a first horizontal scan line within a first image (field data). The line buffer $L_2$ can simultaneously store at most pixel data of a previous horizontal scan line adjacent to the first horizontal scan line within a second image (also field data). The line buffer $L_3$ can simultaneously store pixel data of a next horizontal scan line adjacent to the first horizontal scan line within the second image. The calculation circuit 110 calculates pixel data in the line buffers $L_2$ and $L_3$ to generate temporary pixel data. Then, the image blocks in the horizontal direction referred by the calculation circuit 110 are generated according to the temporary pixel data and pixel data of the first horizontal scan line in the first image.

Figure 3:
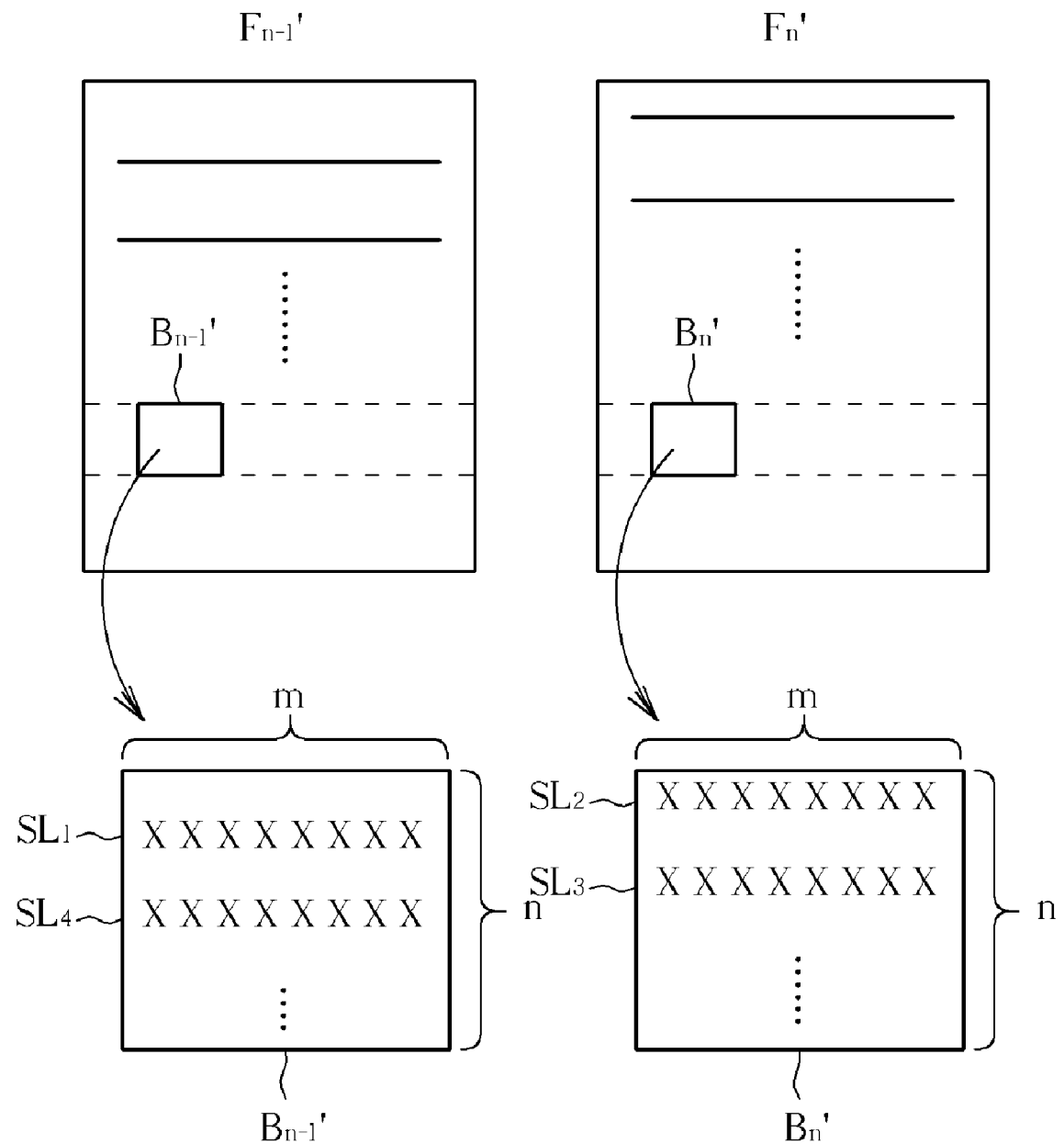
FIG. 3 is a schematic diagram illustrating a block matching operation of the calculation circuit for two fields.

Refer to FIG. 3 showing a diagram illustrating a block matching operation of the calculation circuit 110 for the two fields. In the following, an example of line buffers capable of simultaneously storing at most pixel data of the same horizontal scan line is provided for illustrative purposes; it is not meant to be a limitation of the present invention. Another example of line buffers capable of simultaneously storing pixel data of multiple scan lines corresponding to the same horizontal position can also be applied to this embodiment; this embodiment is not detailed for simplicity. When the calculation circuit 110 calculates a block matching difference between the image block $B_{n-1}'$ of the field $F_{n-1}'$ and the image block $B_n'$ of the field $F_n'$, the line buffer $L_1$ stores at most pixel data of the horizontal scan line $SL_1$ in the field $F_{n-1}'$, and the line buffer $L_2$ stores pixel data of a previous horizontal scan line $SL_2$ adjacent to the horizontal scan line $SL_1$ in the field $F_n'$. In addition, the line buffer $L_3$ stores pixel data of a next horizontal scan line $SL_3$ adjacent to the horizontal scan line $SL_1$ in the field $F_n'$. Since the fields $F_{n-1}'$ and $F_n'$ are respectively an even field and an odd field in this embodiment, for calculating the block matching differences, the calculation circuit 110 firstly averages the pixel data buffered in the line buffers $L_2$ and $L_3$ to generate temporary pixel data. Then, the calculation circuit 110 generates multiple pixel differences according to the temporary pixel data and the pixel data, which is buffered in the line buffer $L_1$, corresponding to the horizontal scan line $SL_1$. The temporary pixel data can also be obtained by weighted average or other calculations in other embodiments. Afterwards, in order to calculate other pixel differences, the line buffer $L_2$ changes to store pixel data of a horizontal scan line $SL_4$ in the field $F_{n-1}'$; the calculation circuit 110 averages the pixel data of the horizontal scan lines $SL_1$ and $SL_4$ to generate new temporary pixel data, and derives pixel differences according to the new temporary pixel data and the pixel data, which is buffered in the line buffer $L_3$, corresponding to the horizontal scan line $SL_3$. Accordingly, all pixel differences can be derived. Similarly, by summing up all the pixel differences, the calculation circuit 110 derives a block matching difference between the image blocks $B_{n-1}'$ and $B_n'$. Further, the number of pixels within the image blocks $B_{n-1}'$ and $B_n'$ and the measure of square of the image blocks $B_{n-1}'$ and $B_n'$ are not meant to be limitations of the present invention. For instance, the image blocks $B_{n-1}'$ and $B_n'$ can be image areas formed by one horizontal scan line and m vertical lines. The present invention does not limit the image blocks $B_{n-1}'$ and $B_n'$ to be image areas formed by n horizontal scan lines and m vertical lines (as shown in FIG. 3). For the image areas formed by one horizontal scan line and m vertical lines, still only three line buffers are required for completing the block matching operation; further computation procedure is similar to that in the above-described example, and thus is not detailed for brevity.

Moreover, calculating a pixel difference regarding the foregoing odd and even fields can be achieved in different manners. For instance, when a pixel value $P_1$ of the horizontal scan line $SL_1$ within the image block $B_{n-1}'$ falls between pixel values $P_2$ and $P_3$ of the horizontal scan lines $SL_2$ and $SL_3$ within the image block $B_n'$ and pixels $P_1$, $P_2$ and $P_3$ correspond to the same vertical position, a pixel difference for $P_1$, $P_2$, and $P_3$ is set as zero. The reason is, in two successive fields composed of one odd field and one even field, when a pixel value in the odd/even field falls between two pixel values corresponding to adjacent positions in the vertical direction within the other field, it usually means that an image corresponding to this pixel is a still object. Therefore, the pixel difference for $P_1$, $P_2$, and $P_3$ should be considered zero. Otherwise, when the pixel value $P_1$ does not fall between the pixel values $P_2$ and $P_3$, and a pixel difference between the pixel values $P_1$ and $P_2$ is smaller than that between the pixel values $P_1$ and $P_3$, the pixel difference for $P_1$, $P_2$, and $P_3$ is set as the pixel difference between the pixel values $P_1$ and $P_2$.

Besides, by the use of additional or multiple memories, frames/fields in the input data $DATA_{in}$ can be sequentially stored in the memories instead of in the single memory 105. When the calculation circuit 110 occupies the bandwidth of a certain memory for reading pixel data stored in this memory and transmitting the read pixel data to the internal line buffers of the calculation circuit 110, another memory can be directly utilized for receiving frames/fields of the input data $DATA_{in}$ since the bandwidth of the memory is not occupied and remains available. For this reason, the operation for receiving frames/fields of the input data $DATA_{in}$ and operation of the calculation circuit 110 to read required pixel data will not occupy the same memory at the same time. The operating speed of the image processing apparatus 100 is increased accordingly.

Those skilled in the art will readily observe that numerous modifications and alterations of the device and method may be made while retaining the teachings of the invention.

What is claimed is:

1. An image processing method, comprising steps of:
    using a calculation circuit for generating a block matching result by performing a block matching operation according to a plurality of image blocks in a horizontal direction without referring to an image block in a vertical or other directions excluding the horizontal direction; and
    performing an image processing operation according to the block matching result of the block matching operation;
    wherein the image processing operation is an image interpolation operation, and, and the step of performing the image processing operation according to the block matching result of the block matching operation comprises:
        when the block matching result indicates that a plurality of block matching differences calculated according to the plurality of image blocks in the horizontal direction are larger than a predetermined threshold, directly repeating an image block of a previous image, the image block of the previous image being corresponding to a position to be interpolated; and
        when the block matching result indicates that a minimum block matching difference of the plurality of block matching differences is not larger than the predetermined threshold, performing the image interpolation operation for the position to be interpolated according to a motion vector corresponding to the minimum block matching difference.

2. An image processing apparatus, comprising:
    a calculation circuit, performing a block matching operation to generate a block matching result according to a plurality of image blocks in a horizontal direction without referring to an image block in a vertical or other directions excluding the horizontal direction; and
    an image processing circuit, coupled to the calculation circuit, performing an image processing operation according to the block matching result of the block matching operation;
    wherein the image processing operation is an image interpolation operation; when the block matching result indicates that a plurality of block matching differences calculated according to the plurality of image blocks in the horizontal direction are larger than a predetermined threshold, the image processing circuit directly repeats an image block of a previous image, the image block of the previous image being corresponding to a position to be interpolated; and when the block matching result indicates that a minimum block matching difference of the plurality of block matching differences is not larger than the predetermined threshold, the image processing circuit performs the image interpolation operation for the position to be interpolated according to a motion vector corresponding to the minimum block matching difference.

3. The image processing apparatus of claim 2, further comprising:
    a memory, coupled to the calculation circuit, storing input frame data or input field data.

4. The image processing apparatus of claim 2, wherein the calculation circuit comprises a first line buffer and a second line buffer; and the first and second line buffers respectively stores at most pixel data corresponding to a horizontal position in two images, where the two images are frame data.

5. The image processing apparatus of claim 2, wherein the calculation circuit comprises:
   a first line buffer, storing at most pixel data of a first horizontal line within a first image;
   a second line buffer, storing at most pixel data of a previous horizontal line adjacent to the first horizontal line within a second image; and
   a third line buffer, storing at most pixel data of a next horizontal line adjacent to the first horizontal line within the second image;
   wherein the calculation circuit calculates pixel data stored in the second and third line buffers to generate specific pixel data, and the plurality of image blocks are generated according to the pixel data of the first horizontal line within the first image and the specific pixel data, where the first and second images are field data.

6. An image processing method, comprising steps of:
   using a calculation circuit for performing a block matching operation to generate a block matching result corresponding to a position to be interpolated; and
   performing an image interpolation operation according to the block matching result by referring to an image block having a same horizontal position as the position to be interpolated without referring to an image block in a vertical or other directions excluding a horizontal direction;
   wherein the step of performing the image interpolation operation according to the block matching result comprises:
      when the block matching result indicates that a plurality of block matching differences calculated according to the plurality of image blocks having the same horizontal position as the position to be interpolated are larger than a predetermined threshold, directly repeating an image block of a previous image, the image block of the previous image being corresponding to the position to be interpolated; and
      when the block matching result indicates that a minimum block matching difference of the plurality of block matching differences is not larger than the predetermined threshold, performing the image interpolation operation for the position to be interpolated according to a motion vector corresponding to the minimum block matching difference.

7. The image processing method of claim 6, wherein the block matching operation is performed according to a plurality of image blocks in the horizontal direction without referring to an image block in the vertical or other directions excluding the horizontal direction.

8. An image processing apparatus, comprising:
   a calculation circuit, performing a block matching operation to generate a block matching result corresponding to a position to be interpolated; and
   an image processing circuit, coupled to the calculation circuit, performing an image interpolation operation according to the block matching result by referring to an image block having a same horizontal position as the position to be interpolated without referring to an image block in a vertical or other directions excluding a horizontal direction;
   wherein when the block matching result indicates that a plurality of block matching differences calculated according to the image blocks having a same horizontal position as the position to be interpolated are larger than a predetermined threshold, the image processing circuit directly repeats an image block of a previous image, the image block being corresponding to the position to be interpolated; and, when the block matching result indicates that a minimum block matching difference of the block matching differences is not larger than the predetermined threshold, the image processing circuit performs the image interpolation operation for the position to be interpolated according to a motion vector corresponding to the minimum block matching difference.

9. The image processing apparatus of claim 8, wherein the calculation circuit performs the block matching operation by referring to a plurality of image blocks in a horizontal direction without referring to an image block in the vertical direction or in the other directions excluding the horizontal direction.

10. The image processing apparatus of claim 8, further comprising:
    a memory, coupled the calculation circuit, storing a plurality of input frame data or input field data.

11. The image processing apparatus of claim 8, wherein the calculation circuit comprises a first line buffer and a second line buffer, the first and second line buffers simultaneously storing pixel data corresponding to a same horizontal position in two images at most, and the two images are frames.

12. The image processing apparatus of claim 8, wherein the calculation circuit comprises:
    a first line buffer, simultaneously storing at most pixel data of a first horizontal line within a first image;
    a second line buffer, simultaneously storing at most pixel data of a previous horizontal line adjacent to the first horizontal line within a second image; and
    a third line buffer, simultaneously storing at most pixel data of a next horizontal line adjacent to the first horizontal line within the second image;
    wherein the calculation circuit is arranged to calculate the pixel data stored in the second line buffer and the pixel data stored in the third line buffer to generate at least one specific pixel data, and the plurality of image blocks of the first horizontal line are generated according to the pixel data of the first horizontal line within the first image and the specific pixel data, where the first and second images are field data.

* * * * *